(12) United States Patent
Mayer et al.

(10) Patent No.: US 7,017,334 B2
(45) Date of Patent: Mar. 28, 2006

(54) COMPACT FASTENING COLLAR AND STUD FOR CONNECTING WALLS OF A NOZZLE LINER AND METHOD ASSOCIATED THEREWITH

(75) Inventors: Robert Russell Mayer, Manchester, CT (US); Eric Conrad Engsberg, Mansfield Center, CT (US)

(73) Assignee: United Technologies Corporation, East Hartford, CT (US)

( * ) Notice: Subject to any disclaimer, the term of this patent is extended or adjusted under 35 U.S.C. 154(b) by 134 days.

(21) Appl. No.: 10/741,836

(22) Filed: Dec. 18, 2003

(65) Prior Publication Data

US 2005/0132714 A1 Jun. 23, 2005

(51) Int. Cl.
F02K 1/82 (2006.01)

(52) U.S. Cl. ..................................... 60/266; 239/127.3

(58) Field of Classification Search .................. 60/266, 60/766, 770, 232, 752; 239/127.1, 127.3; 411/437

See application file for complete search history.

(56) References Cited

U.S. PATENT DOCUMENTS

| | | | | |
|---|---|---|---|---|
| 2,169,182 | A | * | 8/1939 | Kost .......................... 411/437 |
| 3,570,361 | A | * | 3/1971 | Tinnerman ................... 411/437 |
| 4,121,768 | A | | 10/1978 | Young |
| 4,446,693 | A | | 5/1984 | Pidcock et al. |
| 4,747,543 | A | | 5/1988 | Madden |
| 5,079,912 | A | * | 1/1992 | Cires et al. ................... 60/266 |
| 5,080,284 | A | | 1/1992 | Cires |
| 5,265,409 | A | | 11/1993 | Smith, Jr. et al. |
| 5,388,765 | A | | 2/1995 | Hill et al. |
| 5,560,197 | A | | 10/1996 | Ansart et al. |
| 5,655,361 | A | | 8/1997 | Kishi |
| 5,782,294 | A | | 7/1998 | Froemming et al. |
| 6,045,310 | A | * | 4/2000 | Miller et al. ................. 411/383 |
| 6,351,949 | B1 | * | 3/2002 | Rice et al. ..................... 60/752 |

FOREIGN PATENT DOCUMENTS

| | | |
|---|---|---|
| EP | 0 289 443 | 11/1988 |
| EP | 0 493 304 | 7/1992 |
| JP | 60-219420 | 11/1985 |

OTHER PUBLICATIONS

European Search Report Appl. No. EP 04257592, dated Mar. 16, 2005.

* cited by examiner

*Primary Examiner*—Ted Kim
(74) *Attorney, Agent, or Firm*—Carlson, Gaskey & Olds

(57) ABSTRACT

A combination for connecting a hot sheet and a cold sheet of a nozzle liner in spaced relationship apart includes a stud having a main body wherein the stud is attached to the hot sheet and a portion of the stud extends through an opening in the cold sheet. A support spaces the hot sheet and the cold sheet apart. A generally planar fastening collar is affixed to the portion of the stud extending through the cold sheet. A first length is defined by the portion of the stud extending through the cold sheet to a distal end of the stud. A second length is defined between a first planar surface of the collar facing the cold sheet and a second planar surface of the collar opposite the first surface. Each of the first and second lengths is less is less than a diameter of the main body of the stud.

34 Claims, 4 Drawing Sheets

COMPACT FASTENING COLLAR AND STUD FOR CONNECTING WALLS OF A NOZZLE LINER AND METHOD ASSOCIATED THEREWITH

The United States government has rights to the present invention pursuant to a contract, number F33657-01-C-1240, between the United States Air Force and the present assignee.

TECHNICAL FIELD

The present invention relates generally to fastening apparatus for nozzle liners that line an exhaust gas passage in a turbine engine, and more particularly to fastening apparatus that connects first and second walls of such liners.

BACKGROUND ART

Various structures for cooling a liner surface in contact with host exhaust gas passing through a turbine engine have been disclosed in the prior art. Liners typically include a first wall, referred to as a hot sheet, having a surface in contact with the exhaust gas and a second wall, referred to as a cold sheet, spaced apart from and fastened to the first wall. A space is defined between the first and second walls and cooling air travels therethrough, inhibiting overheating of the hot sheet. The cooling air might be provided by air supplied from a fan section upstream of the exhaust nozzle. In impingement cooling, a pressure differential typically exists between the cooling air and the exhaust gas. The pressure differential draws the cooling air into apertures in the cold sheet, and the cooling air then strikes surfaces of the hot sheet.

Kishi U.S. Pat. No. 5,655,361 discloses a sound absorbing honeycomb structure disposed between a nozzle plate and a liner. Cooling air flows between the nozzle plate and the liner, and the cooling air impinges against the liner for cooling. In some embodiments, the liner includes passages that provide fluid communication to the exhaust gas such that the cooling air flows into, and is combined with, exhaust gas.

Commonly assigned Madden U.S. Pat. No. 4,747,543 discloses a nozzle assembly for a turbine engine, which includes upper and lower movable flaps. Each of the flaps includes a liner having a surface in contact with combustion gas. Each of the liners defines a space through which cooling air flows. A plurality of spaced apart hinges enable movement of the flaps.

Commonly assigned Froemming et al. U.S. Pat. No. 5,782,294, incorporated herein by reference, discloses an inner wall (i.e., a hot sheet) and an outer wall (i.e., a cold sheet) spaced apart and fastened together. A surface of the inner wall, facing the outer wall, includes intersecting ribs that space the walls apart. Threaded studs extend from intersecting regions of the ribs and through bores in the outer wall. Crimp nuts are fastened to the studs, thereby capturing the outer wall between the ribs and the crimp nuts, and thus, fastening the walls together in spaced relationship.

SUMMARY OF THE INVENTION

In accordance with one aspect of the present invention, a combination for connecting a hot sheet and a cold sheet of a nozzle liner in spaced relationship apart includes a stud having a main body wherein the stud is attached to the hot sheet and a portion of the stud extends through an opening in the cold sheet. A support spaces the hot sheet and the cold sheet apart. A generally planar fastening collar is affixed to the portion of the stud extending through the cold sheet. A first length is defined by the portion of the stud extending through the cold sheet to a distal end of the stud. A second length is defined between a first planar surface of the collar facing the cold sheet and a second planar surface of the collar opposite the first surface. Each of the first and second lengths is less than a diameter of the main body of the stud.

According to a further aspect of the present invention, a combination for connecting a hot sheet and a cold sheet of a nozzle liner in spaced apart relationship includes a stud having a main body. The stud is attached to the hot sheet and a portion of the stud extends through an opening in the cold sheet. A support spaces the hot sheet and the cold sheet apart. A generally planar fastening collar is affixed to the portion of the stud extending through the cold sheet. A first length is defined by the portion of the stud extending through the cold sheet to a distal end of the stud. A second length is defined between a first planar surface of the collar facing the cold sheet and a second planar surface of the collar opposite the first surface. A distance is defined between the hot sheet and the cold sheet. Each of the first and second lengths is less than the distance between the cold sheet and the hot sheet.

In accordance with a further aspect of the present invention, a method of connecting a hot sheet and a cold sheet of a nozzle liner in spaced apart relationship includes the step of providing a stud affixed to the hot sheet. A portion of the stud is disposed through an opening in the cold sheet. The portion defines a first length from the cold sheet to a distal end of the stud. A generally planar fastening collar having a bore is provided. A first surface of the collar is placed toward the cold sheet such that the portion extends into the bore. The collar includes a second surface opposite the first surface, and the first and second surfaces define a second length therebetween. The collar is permanently affixed to the stud. Each of the first and second lengths is less than a diameter of the main body of the stud.

Other aspects and advantages of the present invention will become apparent upon consideration of the following detailed description.

DESCRIPTION OF THE PREFERRED EMBODIMENTS

Figure 1:
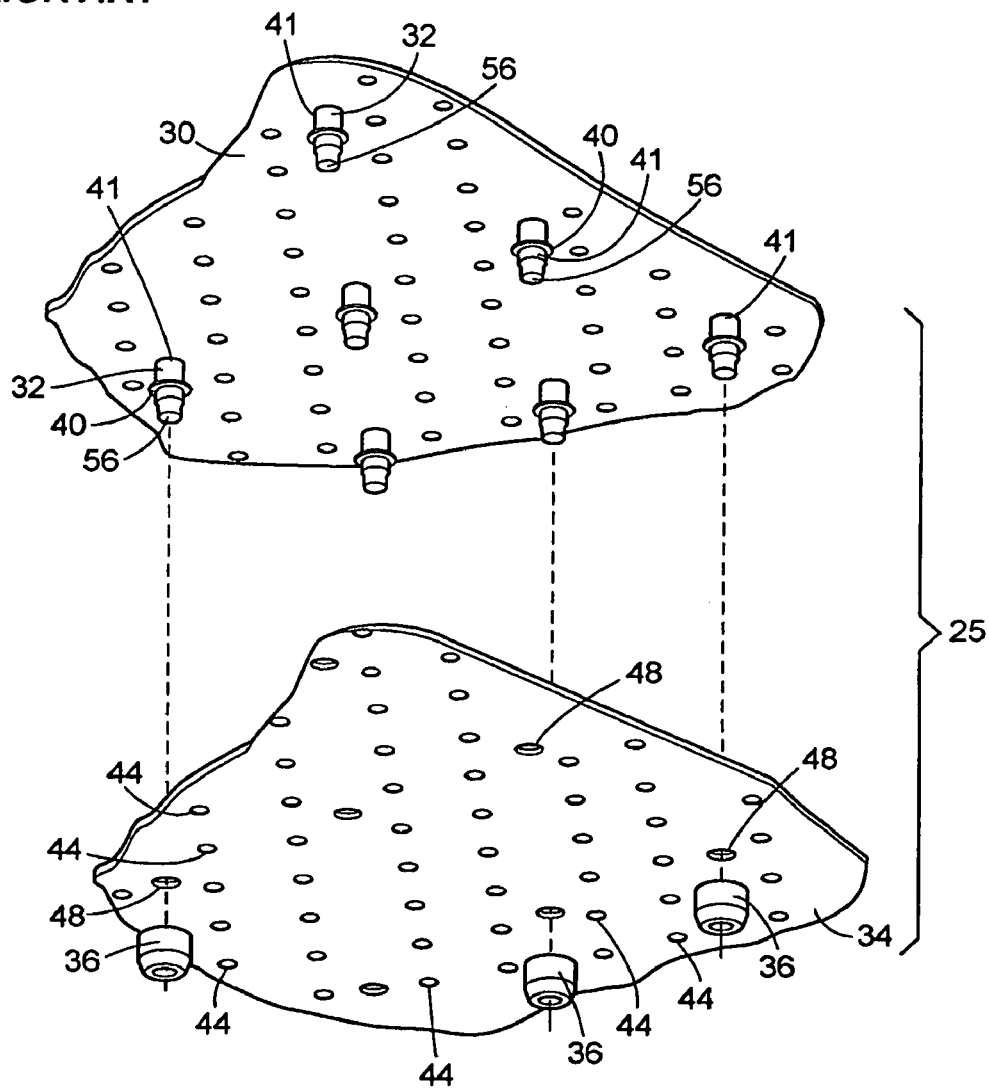
FIG. 1 is an exploded isometric view illustrating a hot sheet and a cold sheet and conventional studs and conventional fastening collars used to connect the sheets.
Figure 2:
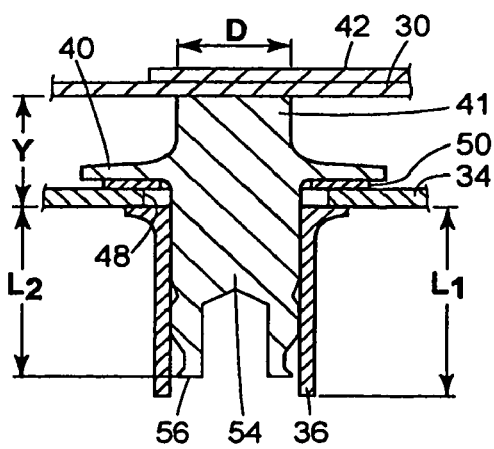
FIG. 2 is a fragmentary sectional view of the conventional assembled components of FIG. 1.

FIGS. 1 and 2 show prior art conventional fastening arrangements, while FIGS. 4–7 illustrate an apparatus according to the present invention. Referring to FIGS. 1 and 2, a liner 25 includes a hot plate or sheet 30 having studs 32 welded or otherwise affixed thereto. A cold sheet 34 is joined to the hot sheet 30 by a suitable fastening arrangement. For example, crimp collars 36 may be threaded onto the studs 32 and then crimped to permanently affix the collars 36 to the studs 32. The collars 36 and shoulder flanges 40 that extend from a main body 41 of the studs 32 capture the cold sheet 34 therebetween, and thus fasten the hot sheet 30 and the cold sheet 34 together in spaced relationship apart. It should be noted that the shoulder flanges 40 may be replaced with any other suitable support(s) that spaces the hot sheet 30 and the cold sheet 34 apart. For example, simple metal blocks (not shown) may be placed between the hot sheet 30 and the cold sheet 34. As seen in FIG. 2, the hot sheet 30 and the cold sheet 34 define a passage therebetween and cooling air passes through the passage to inhibit overheating of the hot sheet 30 beyond the heating capacity of the material of the hot sheet 30. In this regard, a surface 42 of the hot sheet 30 opposite the passage is exposed to hot combustion exhaust gases flowing through the nozzle of the turbine engine. The surface 42 may include a heat resistant coating thereon. The cooling air may be supplied to the passage in any suitable manner, and the manner in which the cooling air is supplied is not particularly important to the present invention. For example, the cold sheet 34 may include apertures 44 that draw air into the passage.

Figure 3:
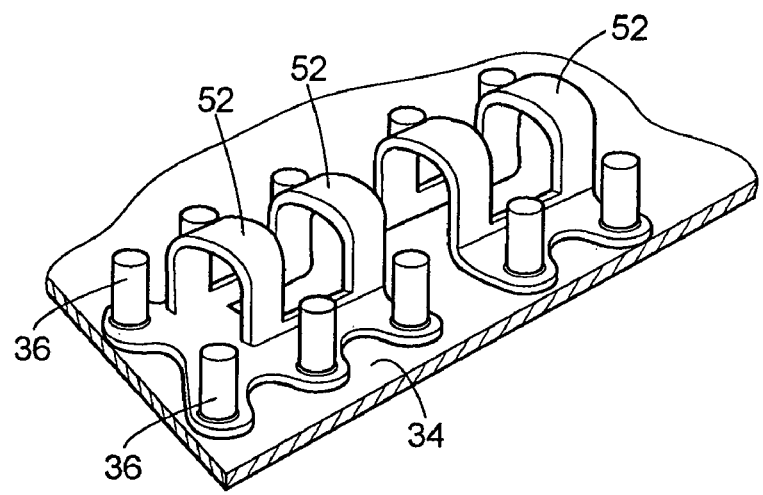
FIG. 3 is a fragmentary isometric view illustrating conventional hanger brackets attached to a cold sheet.

The cold sheet 34 defines bores 48 sized slightly larger than a diameter of the studs 32, thereby creating a circumferential clearance space around the studs 32. The clearance spaces allow the hot sheet 30 to move longitudinally relative to the cold sheet 34 as the hot sheet 30 expands or contracts in response to thermal conditions. It should be noted that the crimp collars 36 are not affixed so closely to the shoulder flanges 40 as to tightly pin the cold sheet 34 and prevent relative longitudinal or tangential movement of the hot sheet 30 to the cold sheet 34. FIG. 2 shows a washer 50 that may optionally be provided between the shoulder flange 40 and the cold sheet 34. The washers 50 are provided as an air seal for the clearance spaces around the studs 32. The washers 50 could alternatively be provided between the crimp collars 36 and the cold sheet 34 if desired. Referring to FIG. 3, hanger brackets 52 may be fastened between the collars 36 and the cold sheet 34. The hanger brackets 52 are used to hang the liner 25 from a fixed support wall (not shown) within the aircraft engine. Referring particularly to FIG. 2, each of the crimp collars 36 includes a length dimension $L_1$ that is longer than a diameter D of the main body 41 of the studs 32. In addition, the dimension $L_1$ is longer than a distance Y defined between the sheets 30, 34. A portion 54 of the studs 32 extending through the bores 48 defines a length dimension $L_2$ between a distal end 56 of the studs 32 and the cold sheet 34. The dimension $L_2$ is substantially longer than the distance Y or the stud diameter D. Known dimensions for $L_1$ and/or $L_2$ are typically between 1 and three times the stud diameter D.

Figure 4:
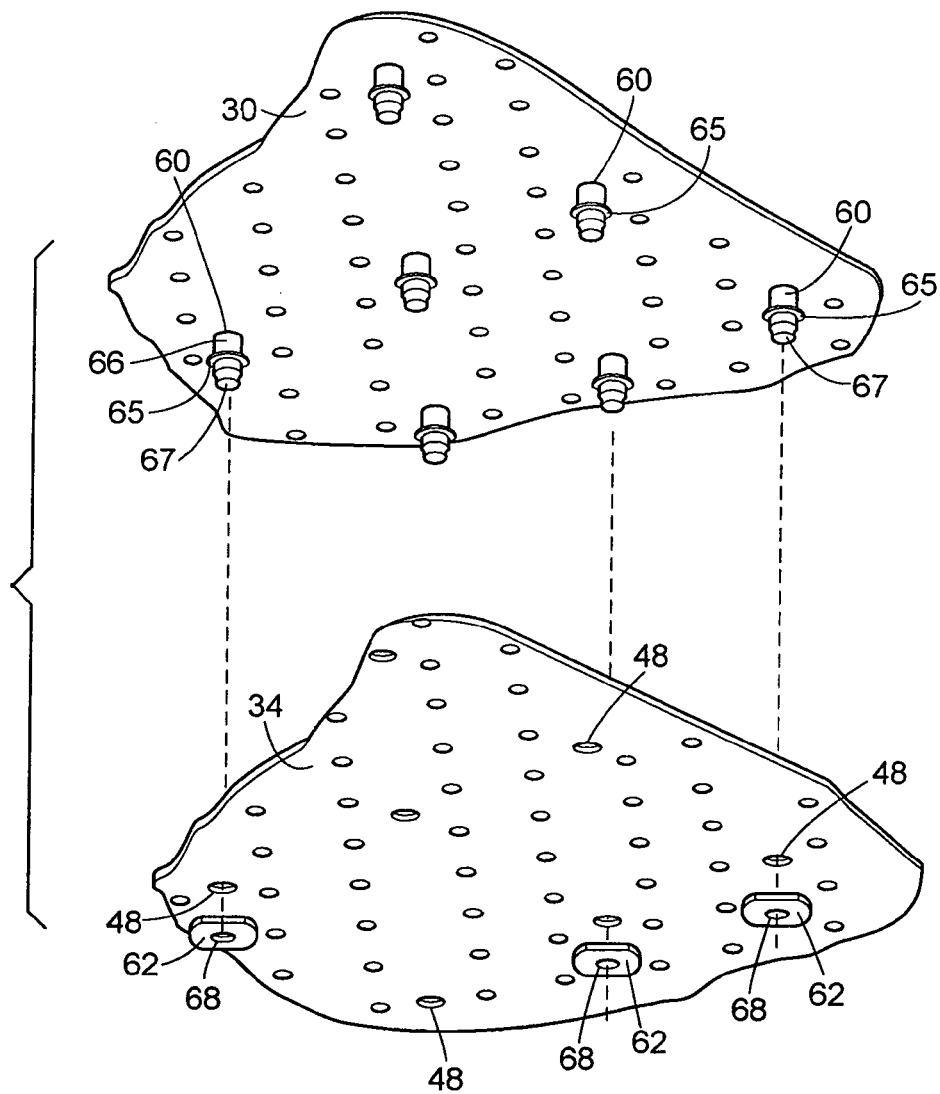
FIG. 4 is an exploded isometric view of sheets, studs, and fastening collars according to the present invention.
Figure 5:
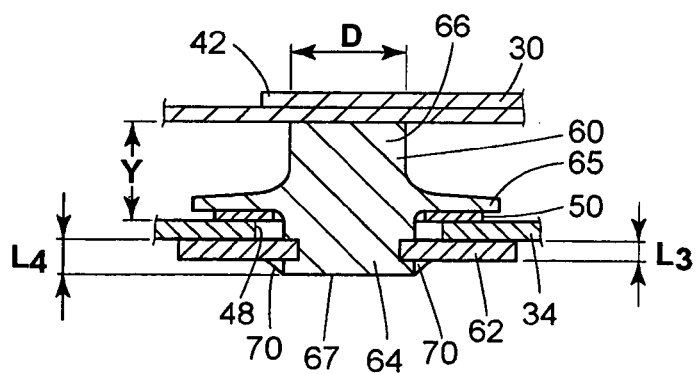
FIG. 5 is a fragmentary sectional view of the assembled components of FIG. 4.
Figure 6:
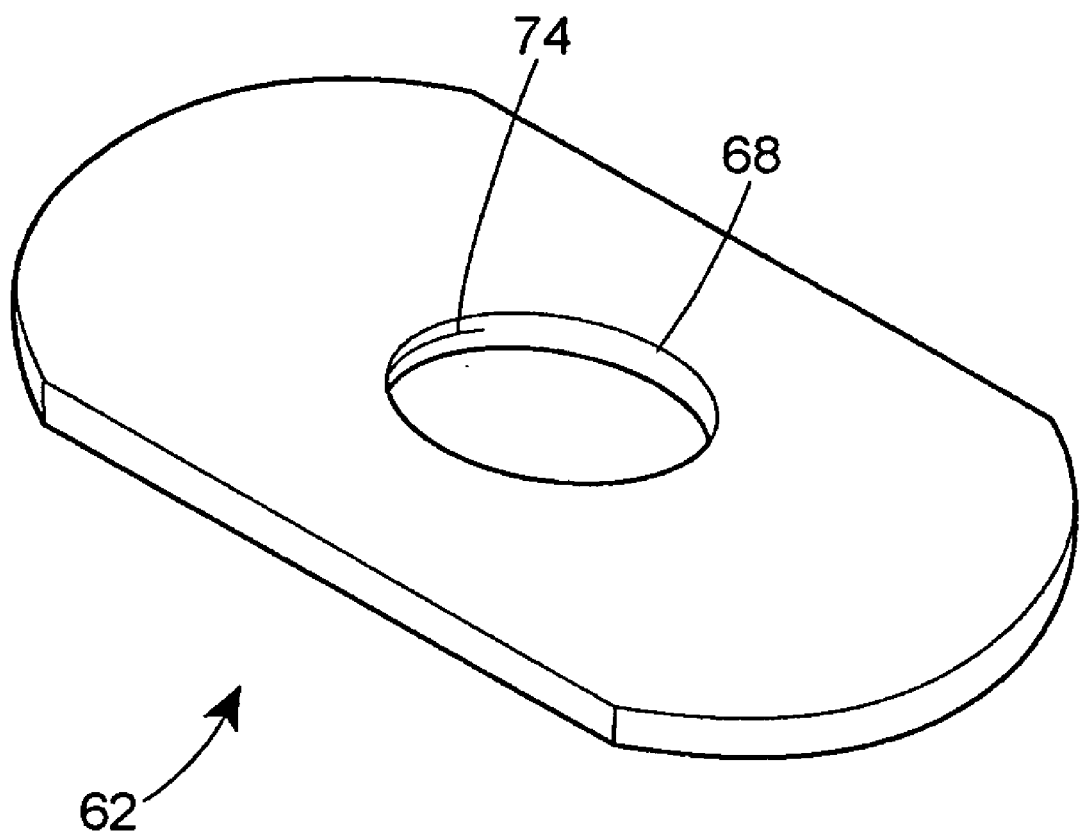
FIG. 6 is an enlarged isometric view of a fastening collar according to the present invention.

In accordance with the present invention, FIGS. 4–6 illustrate an embodiment of fastening apparatus according to the present invention having dimensions shorter than $L_1$ and $L_2$, and thus providing greater clearance adjacent the cold sheet 34. The hot sheet 30 carries studs 60, which may be shorter in overall length than the studs 32. As is clear from the drawings, the studs 60 have a face in contact with the hot sheet 30. The stud does not extend through any hole in the hot sheet, but rather than simply abuts a face of the hot sheet. A plurality of planar collars 62 are affixed to portions 64 of he studs 60 extending through the cold sheet 34. The collars 62 and shoulder flanges 65, extending from a main body 66 of the studs 60, capture the cold sheet 34 therebetween. As noted above, the shoulder flanges 65 may be substituted with some other suitable means for spacing the sheets 30, 34 apart. A dimension $L_3$ is defined between opposite planar surfaces of the collar 62 60. A dimension $L_4$ is defined by the portion 64 of the stud 60 extending through the bore 48. Specifically, the dimension $L_4$ is defined between a distal end 67 of the stud 60 and the cold sheet 34. As shown, the dimensions $L_3$ and $L_4$ are much smaller than the dimensions $L_1$ and $L_2$ relative to the dimensions D and Y. In fact, the dimensions $L_3$, $L_4$ may be less than one-half of D, less than one-third of D, and even less than one-fifth of D. In this regard, for a stud of 0.160 inches in diameter the minimum practical pitch is about 0.030 inches. In addition, $L_3$ and $L_4$ are shown as less than one-third the distance Y between the sheets 30, 34. Alternatively, the dimensions $L_3$, $L_4$ could be between Y and one-third Y, such as one-half Y. The dimensions $L_3$ and $L_4$ provide greater clearance for the planar fastening collars 62 than the collars 36 shown in FIGS. 1 and 2 having the dimensions $L_1$ and $L_2$. A first advantage of the shorter dimensions $L_3$ and $L_4$ is that the collars 62 are lighter than the collars 36, and thus more of the collars 62 may be used to fasten the hot sheet 30 and the cold sheet 34 together while staying within desired weight parameters of the liner 25. In addition, the greater clearance of the collars 62 allows for easier installation of the collars 62 in locations of the liner 25 that have very little clearance space because of equipment or engine walls (not shown) closely spaced to the liner 25. This greater clearance may also be an advantage for making repairs to the nozzle liner 25 or repairs to equipment disposed near the nozzle liner 25. Once the distal end 67 of the stud 60 is placed into or through a bore 68 of the collar 62, the collar 62 is then permanently affixed to the stud 60 in any suitable manner. This could include mechanically threading the collar onto the stud 60, welding the collar 62 to the stud 60, soldering or brazing the collar 62 to the stud 60, or some combination of mechanically fastening and welding the collar 62 to the stud 60. In this regard, welding the collars 62 may be preferred over purely mechanical fastening (e.g., threading) due to extreme vibrational conditions that tend to be present in nozzle liners. In addition, welding of collars may provide a more durable fastening than using crimp collars, such as those shown in FIGS. 1 and 2, especially for high vibrational conditions. The collars 62 may be welded with a fillet weld 70 (FIG. 5). The fillet weld 70 involves depositing weld material along the juncture of the collar 62 and the studs 60. Fillet welds are typically triangular in cross section as the illustrated fillet weld 70. The weld may also be a fusion weld between the collar 62 and the stud 60. This welds the collars 62 and the stud 60 together with a minimal amount of weld material.

Welding may be facilitated by fixing the collar 62 to the stud 60 prior to welding so that the collar 62 does not move around during welding. For example, the collar 62 could be threaded onto the stud 60 prior to welding. The collar 62 need only be threaded slightly onto the stud 60 to fix the collar 62 in position during welding. Therefore, the collar 62 need only include a small thread. Referring to FIG. 6 for example, the bore 68 of the collar 62 may include a thread 74 that spans an arc less than a full circumference of the bore 68. In fact, the thread 74 could span an arc of as few as three degrees, which may be sufficient to fix the collar 62 in position on the stud 60 for welding, brazing, or other suitable methods for permanently affixing the collar 62 to the stud.

Figure 7:
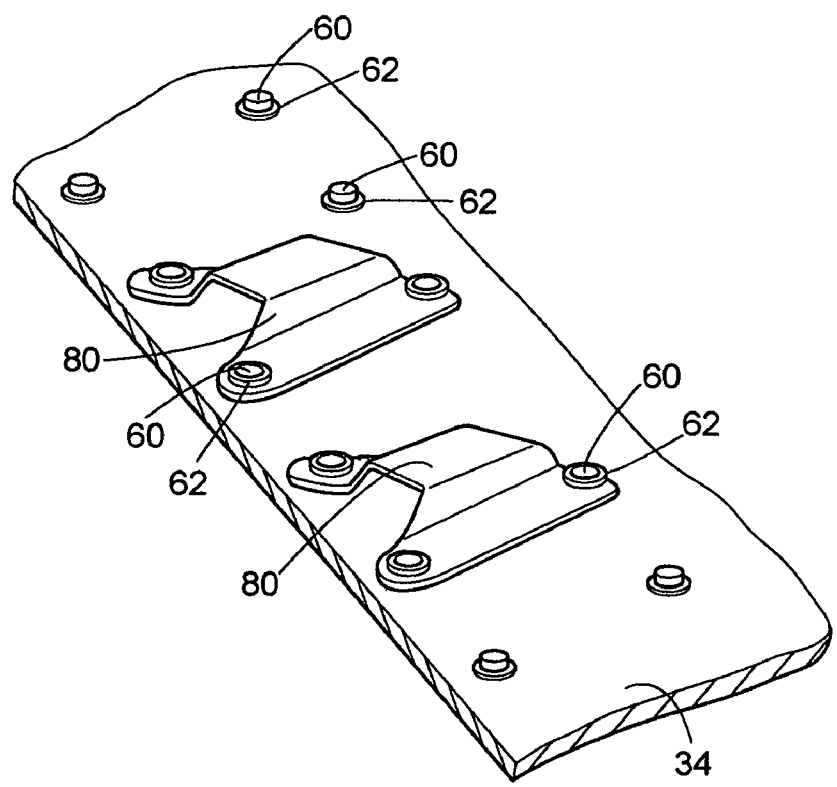
FIG. 7 is a fragmentary isometric view of a cold sheet, collars, and hanger brackets according to the present invention.

Referring to FIG. 7, the cold sheet 34 could include hanger brackets 80, analogous in function to the conventional hanger brackets 52 shown in FIG. 3. It should be noted that the collars 62 as illustrated in FIG. 7 are circumferential in shape rather than elliptical as depicted in FIGS. 4–6. In this regard, the exact shape of the collar 62 may vary, but the collar 62 is always generally planar and compact irrespective of the specific shape. The hanger brackets 80 are shorter in height than the brackets 52, extending a shorter distance from the surface of the cold sheet 34, thereby affording greater clearance. This greater clearance of the hanger brackets 80 is advantageous because the liner 25 can be placed closer to the engine walls of the aircraft such that the nozzle, lined by the liner 25, can have a larger diameter. If desired, necessary, or practical, multiple of the collars 62 can be fastened to the individual studs 60. For example, two of the collars 62 can be fastened for each one of the studs 60 extending through the hanger bracket 80 to support additional weight of the hanger bracket 80. In the event that a plurality of collars are fastened to a stud, one may opt to weld only the outermost collar spaced farthest from the cold sheet 34.

Numerous modifications to the present invention will be apparent to those skilled in the art in view of the foregoing description. Accordingly, this description is to be construed as merely exemplary of the inventive concepts taught herein and is presented for the purpose of enabling those skilled in the art to make and use the invention and to teach the best mode of carrying out same. The exclusive rights to all modifications which come within the scope of the appended claims are reserved.

The invention claimed is:

1. A combination for connecting a hot sheet and a cold sheet of a nozzle liner in spaced relationship apart, comprising;
    a stud having a main body wherein the stud is attached to the hot sheet, said stud having a face in contact with said hot sheet, and over a solid surface of said hot sheet such that said stud does not extend through a hole in said hot sheet to an opposed side of said hot sheet, and a portion of the stud extends through an opening in the cold sheet;
    a support spacing the hot sheet and the cold sheet apart;
    a generally planar fastening collar affixed to the portion of the stud extending through the cold sheet;
    a first length defined by the portion of the stud extending through the cold sheet to a distal end of the stud; and
    a second length defined between a first planar surface of the collar facing the cold sheet and a second planar surface of the collar opposite the first surface;
    wherein each of the first and second lengths is less is less than a diameter of the main body of the stud.

2. The combination of claim 1, wherein the support is a shoulder flange extending from the main body of the stud.

3. The combination of claim 1, wherein each of the first and second lengths is less than one half of the diameter of the main body.

4. The combination of claim 1, wherein each of the first and second lengths is less than one third of the diameter of the main body.

5. The combination of claim 1, wherein each of the first and second lengths is less than one-fifth of the diameter of the main body.

6. The combination of claim 1, wherein each of the first and second lengths is less than a distance between the hot sheet and the cold sheet.

7. The combination of claim 1, wherein the support is a shoulder flange extending from the main body of the stud and wherein the collar and the shoulder flange capture the cold sheet therebetween.

8. The combination of claim 1, further comprising a washer disposed between the shoulder flange and the cold sheet.

9. The combination of claim 1, wherein the planar collar includes a bore surrounding the portion of the stud extending through the cold sheet and wherein the bore includes a thread.

10. The combination of claim 9, wherein the thread has a circumferential extent less than a circumference of the bore.

11. The combination of claim 1, wherein the collar is welded to the stud.

12. The combination of claim 1, further comprising a hanger bracket fastened between the cold sheet and the collar.

13. The combination of claim 1, wherein the collar comprises a first collar, the combination further comprising a second collar also fastened to the stud and wherein only one of the collars is welded to the stud.

14. The combination of claim 1, wherein the opening is sized sufficiently larger than the diameter of the stud to allow relative longitudinal movement of the hot sheet relative to the cold sheet.

15. A combination for connecting a hot sheet and a cold sheet of a nozzle liner in spaced relationship apart, comprising:
    a stud having a main body wherein the stud is attached to the hot sheet, said stud having a face in contact with said hot sheet, and over a solid surface of said hot sheet such that said stud does not extend through a hole in said hot sheet to an opposed side of said hot sheet, and portion of the stud extends through an opening in the cold sheet;
    a support spacing the hot sheet and the cold sheet apart;
    a generally planar fastening collar affixed to a portion of the stud extending through the cold sheet;
    a first length defined by the portion of the stud extending through the cold sheet to a distal end of the stud; and
    a second length defined between a first planar surface of the collar facing the cold sheet and a second planar surface of the collar opposite the first surface;
    a distance defined between the hot sheet and the cold sheet;
    wherein each of the first and second lengths is less than the distance between the cold sheet and the hot sheet.

16. The combination of claim 15, wherein each of the lengths is less than one half of the distance between the sheets.

17. The combination of claim 15, wherein each of the dimensions is less than one third of the distance between the sheets.

18. The combination of claim 15, wherein each of the lengths is les than one-fifth of the distance between the sheets.

19. The combination of claim 15, wherein each of the first and second lengths is less than a diameter of the main body of the stud.

20. The combination of claim 15, further comprising a washer disposed between the shoulder flange and the cold sheet.

21. The combination of claim 15, wherein the collar is welded to the stud.

22. A method of connecting a hot sheet and a cold sheet of a nozzle liner in spaced relationship apart, the method comprising the steps of:

providing a stud affixed to the hot sheet, said stud having a face in facial contact with said hot sheet, and not extending through a hole in the hot sheet to an opposed side of the hot sheet;

disposing a portion of the stud through an opening in the cold sheet wherein the portion defines a first length from the cold sheet to a distal end of the stud;

providing a generally planar fastening collar having a bore;

placing a first surface of the collar toward the cold sheet such that the portion extends into the bore wherein the collar includes a second surface opposite the first surface and wherein the first and second surfaces define a second length therebetween; and permanently affixing the collar to the stud;

wherein each of the first and second lengths is less than a diameter of the main body of the stud.

23. The combination of claim 22, wherein each of the first and second lengths is less than one half of the diameter of the main body.

24. The combination of claim 22, wherein each of the first and second lengths is less than one third of the diameter of the main body.

25. The method of claim 22, wherein each of the lengths is less than a diameter of a distance defined between the sheets.

26. The method of claim 22, wherein the bore includes a thread and the affixing step includes threading the bore onto the stud.

27. The method of claim 22, wherein the bore includes a thread having a circumferential extent less than a circumference of the bore.

28. The method of claim 27, wherein the affixing step includes welding the collar to the stud.

29. The method of claim 22, wherein the collar comprises a first collar, the method further comprising the step of placing a second collar, identical to the first collar onto the stud.

30. The method of claim 22, wherein the affixing step includes welding the collar to the stud.

31. The method of claim 26, wherein the collar has a non-cylindrical outer periphery to provide wrench flats.

32. The combination of claim 15, wherein said collar has a bore that is threaded onto said portion of the stud.

33. The combination of claim 32, wherein said collar has a non-cylindrical outer peripheral surface to provide wrench flats.

34. The combination of claim 9, wherein said planar collar has a non-cylindrical outer peripheral surface to provide wrench flats.

* * * * *